United States Patent
Tontsch et al.

(10) Patent No.: US 11,279,277 B2
(45) Date of Patent: Mar. 22, 2022

(54) ILLUMINATION DEVICE COMPRISING A SCREEN AND OPTICAL WAVEGUIDES FOR DISPLAYING A LINEAR LIGHT; MOTOR VEHICLE AND METHOD FOR OPERATING AN ILLUMINATION DEVICE

(71) Applicant: AUDI AG, Ingolstadt (DE)

(72) Inventors: Friedrich-Uwe Tontsch, Ingolstadt (DE); Johannes Scheuchenpflug, Baar-Ebenhausen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/252,462

(22) PCT Filed: Jul. 31, 2019

(86) PCT No.: PCT/EP2019/070635
§ 371 (c)(1),
(2) Date: Dec. 15, 2020

(87) PCT Pub. No.: WO2020/025675
PCT Pub. Date: Feb. 6, 2020

(65) Prior Publication Data
US 2021/0188164 A1    Jun. 24, 2021

(30) Foreign Application Priority Data
Aug. 2, 2018 (DE) ............. 10 2018 212 886.3

(51) Int. Cl.
*B60Q 3/66* (2017.01)
*B60Q 3/80* (2017.01)
(Continued)

(52) U.S. Cl.
CPC .............. *B60Q 3/66* (2017.02); *B60Q 3/10* (2017.02); *B60Q 3/217* (2017.02); *B60Q 3/80* (2017.02)

(58) Field of Classification Search
CPC .............. B60Q 3/62; B60Q 3/66; B60Q 3/20
See application file for complete search history.

(56) References Cited

U.S. PATENT DOCUMENTS 5,502,457 A    3/1996  Sakai et al.
6,628,867 B1 *  9/2003  Solntsev ............... G02B 6/06
                                                    362/559
(Continued)

FOREIGN PATENT DOCUMENTS

DE         102 44 792 A1    4/2004
DE    10 2005 011 956 A1    9/2006
(Continued)

OTHER PUBLICATIONS

Notification of Transmittal of Copies of Translation of the International Preliminary Report on Patentability dated Feb. 11, 2021, in connection with corresponding International Application No. PCT/EP2019/070635; 8 pages.

(Continued)

*Primary Examiner* — Robert J May
(74) *Attorney, Agent, or Firm* — Maier & Maier, PLLC

(57) ABSTRACT

An illumination device for a motor vehicle for displaying a linear light including a plurality of optical waveguides, an illuminating element having a plurality of light sources for coupling light into a respective first end face of the plurality of optical waveguides, and an emitting part for generating a linear light distribution, the optical waveguides being arranged with a respective second end face, which is different from the first end face, through the emitting part relative to one another along precisely one line.

19 Claims, 1 Drawing Sheet

(51) Int. Cl.
*B60Q 3/10* (2017.01)
*B60Q 3/217* (2017.01)

(56) References Cited

U.S. PATENT DOCUMENTS

| | | | |
|---|---|---|---|
| 7,456,805 B2 | 11/2008 | Ouderkirk et al. | |
| 7,540,644 B1 | 6/2009 | Allen | |
| 8,331,749 B2* | 12/2012 | Lew | G06F 3/147 385/116 |
| 2005/0286846 A1* | 12/2005 | Bayley | G02F 1/133524 385/116 |
| 2015/0307033 A1* | 10/2015 | Preisler | B60R 13/02 362/488 |

FOREIGN PATENT DOCUMENTS

| | | |
|---|---|---|
| DE | 10 2010 021 032 A1 | 11/2011 |
| DE | 10 2013 213 014 A1 | 1/2015 |
| DE | 10 2014 212 734 A1 | 1/2016 |
| DE | 11 2014 005 762 T5 | 11/2016 |
| DE | 10 2016 007 876 A1 | 12/2016 |
| DE | 10 2017 211 585 A1 | 1/2019 |
| WO | 03/096076 A2 | 11/2003 |
| WO | 2018/108480 A1 | 6/2018 |

OTHER PUBLICATIONS

Examination Report dated May 21, 2019 in corresponding German application No. 10 2018 212 886.3; 16 pages including Machine-generated English-language translation.
International Search Report dated Nov. 4, 2019 in corresponding International application No. PCT/EP2019/070635; 8 pages.
Written Opinion of the International Searching Authority dated Nov. 4, 2019 in corresponding International application No. PCT/EP2019/070635; 10 pages including Machine-generated English-language translation.

* cited by examiner

ILLUMINATION DEVICE COMPRISING A SCREEN AND OPTICAL WAVEGUIDES FOR DISPLAYING A LINEAR LIGHT; MOTOR VEHICLE AND METHOD FOR OPERATING AN ILLUMINATION DEVICE

FIELD

The disclosure relates to an illumination device for a motor vehicle for displaying an ambient light, in particular a linear light, comprising a plurality of optical waveguides, an illuminating element having a plurality of light sources for coupling light into a first end face of each of the plurality of optical waveguides, and an emitting part for generating a light distribution that is not necessarily linear, the optical waveguides being arranged with a respective second end face, which is different from the first end face, along precisely one line relative to one another through the emitting part (e.g. along a straight line or along a line that conforms to other geometric shapes). The disclosure further relates to a motor vehicle and to a method for operating an illumination device in a motor vehicle.

BACKGROUND

A generic illumination device is known, for example, from DE 10 2014 212 734 A1. The cited publication discloses a trim paneling component having a plurality of light-emitting surfaces, which are provided by through openings. Optical waveguides are arranged in the through openings, with light from at least one light source being able to pass through the optical waveguides into the interior of the vehicle.

DE 10 2005 011 956 A1 and U.S. Pat. No. 5,502,457 A also disclose the coupling of light, which is emitted through a screen, into an optical waveguide. This enables content that is displayed on the screen to be transmitted to another location for display.

The purpose of the generic illumination device may be to optically upgrade the interior of the motor vehicle by means of the linear light distribution. Alternatively or additionally, the linear light distribution may be used to visualize the operating state of the motor vehicle. In particular, precisely one linear light distribution is generated by the illumination device. The precisely one line along which the second end faces are arranged is at least substantially straight in some embodiments. Alternatively or additionally, the precisely one line may be arranged two-dimensionally or three-dimensionally in space. The precisely one line may be curved, in particular in a plane or lying on a free-form surface. For example, the line may be shaped in conformance with a geometric shape, for example a rectangle or a heart. The optical waveguides are designed particularly to transport light from the illuminating element, in particular from the plurality of light sources, to the emitting part. The linear light distribution is ensured by the arrangement of the optical waveguides on the emitting part. The optical waveguides may be plastic or glass fibers, for example.

SUMMARY

The object of the present invention is to enable an improved display of a linear light distribution.

To enable an improved generation of a linear light distribution, the invention provides that the illuminating element is embodied as a screen, wherein the plurality of light sources are provided by pixels of the screen and the illumination device is configured to influence the linear light distribution along the precisely one line by the targeted actuation of different pixels of the screen. In other words, according to the invention conventional light sources that are used according to the prior art to generate a linear light distribution, for example laser diodes or light emitting diodes, are replaced by the screen. The pixels of the screen provide an increased number of independently actuable light sources as compared with the prior art. It is provided in particular that the plurality of optical waveguides are arranged substantially over the entire surface of the screen. Alternatively or additionally, it may be provided that the plurality of optical waveguides, the second end faces of which are arranged along the precisely one line on the emitting part, are provided by the majority, i.e. more than one-half, in particular more than 80%, of all optical waveguides that are part of the illumination device and/or are coupled to the screen. For example, at least half, in particular at least 80%, of all optical waveguides that are arranged on the screen are arranged on the emitting part along the precisely one line. In other words, at least half, in particular at least 80%, of the optical waveguides of the illumination device are advantageously configured to contribute to the linear light distribution along the precisely one line.

The emitting part can have a mount in which the optical waveguides are enclosed. Within this mount it is provided, in particular, that each of the optical waveguides has no more than two optical waveguides arranged directly adjacent to one another. In other words, the optical waveguides are enclosed within the emitting part or within the mount in precisely one row.

By using the screen as a light source, a particularly fine gradation of the linear light distribution along the precisely one line can be ensured. This is due to the fact that the number of independent light sources is improved over the prior art. In this way, visualizations, in particular one-dimensional visualizations, can be displayed particularly advantageously, as compared with the prior art, with sliding brightness along the one line. For example, to visualize a one-dimensional wave the linear light distribution can be provided along the precisely one line. In that case, a particularly high-quality visualization of the one-dimensional wave results along the one line due to the increased number of light sources as compared with the prior art.

According to a refinement, it is provided that a coupling element for transforming an emitting angle of the screen to an angle of incidence of the optical waveguides is arranged between the plurality of optical waveguides and the screen. For example, the screen has an emission area that is greater than a maximum angle of incidence of the optical waveguides. In that case, light output emitted by the screen would be lost. The coupling element, which has an optical element, for example, in particular a converging lens, can transform the emitting angle to a suitable angle of incidence for the optical waveguide. This minimizes optical losses. Alternatively, the first end face of the optical waveguides may also be suitably lens-shaped in design. According to a refinement, it is provided that the optical waveguides are arranged in the region of their respective second end face in a plane that extends at least substantially parallel to a main emission direction of the illumination device. In other words, the optical waveguides of the plurality of optical waveguides can all be arranged along the same plane. This plane is arranged at least substantially or fully parallel to the main emission direction of the illumination device. Alternatively or additionally, this plane can be aligned perpendicular to the respective second end faces of the optical waveguides.

Alternatively or additionally, multiple screen pixels can be coupled together into a single optical waveguide from the plurality of optical waveguides by means of a converging lens. The coupling element is designed as such a converging lens, for example. This is particularly advantageous if the number of pixels of the screen is greater than the number of fibers.

According to a refinement, it is provided that a fixing element of the illumination device is configured to optically couple the respective first end faces of each of the plurality of optical waveguides exclusively to precisely one or to multiple predetermined pixels of the screen. The fixing element can comprise a ferrule, by which the optical waveguides are at least partially encircled. The fixing element is designed to ensure that, in each case, only the precisely one or the multiple predetermined pixels of the screen couple light into a respective predetermined optical waveguide. In other words, each fixing element implements a predefined optical coupling of one optical waveguide exclusively to precisely one or to multiple predetermined pixels of the screen. In this way, it can be ensured that the coupling of light into a respective one of the optical waveguides can be controlled by actuating the precisely one or the multiple predetermined pixels.

According to a refinement, it is provided that the illumination device comprises at least one diffuser plate, which is configured to diffuse light emitted by the optical waveguides. In particular, the at least one diffuser plate is part of the emitting part. The at least one diffuser plate is arranged, in particular, at the second end faces of the plurality of optical waveguides. The illumination device may have a single diffuser plate for all optical waveguides, for example, or a respective diffuser plate for each of the optical waveguides. Such a diffuser plate or multiple such diffuser plates enable a diffuse and homogeneous light effect of the light emitted through the optical waveguides to be produced. In this way, the interior of the motor vehicle can be illuminated in a particularly atmospheric or effective manner by means of the illumination device.

According to a refinement, it is provided that the precisely one line by which the linear light distribution is defined does not have a bend of more than 90°, in particular more than 45°. In other words, the precisely one line along which the second end faces are arranged relative to one another through the emitting part does not have a bend of more than 90°, or especially advantageously does not have a bend of more than 45°. It can be provided that the precisely one line is at least substantially straight. Such an embodiment enables a particularly advantageous illumination of the motor vehicle to be provided by the illumination device.

A second aspect of the invention relates to a motor vehicle having an illumination device according to the invention, in which the emitting part is arranged on a vehicle component, in particular on a door or a dashboard of the motor vehicle. In particular, the emitting part is arranged on a vehicle component, in particular the door or the dashboard, in the interior of the motor vehicle. Accordingly, the illumination device can be configured to display a linear light on the vehicle component, in particular the door or the dashboard. For this purpose, the emitting part can be arranged on the vehicle component or recessed in the vehicle component. Alternatively or additionally, the emitting part can be provided at least partially by the vehicle component. The screen, which is provided for coupling light into the optical waveguides, can be arranged concealed, for example, on a further vehicle component that can differ from the aforementioned vehicle component. Concealed means, in particular, that the screen is not visible from the interior of the motor vehicle. In other words, the screen can be arranged behind a trim panel in the interior of the motor vehicle.

Another aspect of the invention relates to a method for operating an illumination device in a motor vehicle, comprising the following steps:
  Coupling of light into a plurality of optical waveguides via a respective first end face of the optical waveguides,
  Coupling of the light out of the optical waveguides via a respective second end face of the optical waveguides, which is different from the first end face, and
  Emission of a single common linear light distribution through the second end faces of the optical waveguides arranged along precisely one line.

To attain the object according to the invention, it is provided that the light is coupled in by means of a screen and that the linear light distribution is influenced along the precisely one line through the targeted actuation of pixels of the screen. In particular, the linear light distribution along the precisely one line is influenced one-dimensionally along the precisely one line through the targeted actuation of pixels of the screen. For example, the linear light distribution is influenced with respect to precisely one coordinate along the precisely one line through the targeted actuation of pixels of the screen. The targeted actuation of the pixels may include specifying a respective brightness and/or color for a respective pixel.

According to a refinement it is provided that, for calibrating the illumination device it is determined which of the pixels of the screen couple light into a respective one of the optical waveguides and these pixels are assigned to the respective optical waveguide, and this assignment is then taken into account in the targeted actuation of the various pixels. For example, the illumination device can be calibrated by switching on each of the pixels of the screen individually, one after the other, and checking to determine which of the optical waveguides the respective pixel is coupling light into. Assignment can then be carried out such that the pixel is assigned to a respective one of the optical waveguides precisely when it is coupling light only into said optical waveguide. This ensures that each of the optical waveguides is assigned only pixels that couple light exclusively into said respective optical waveguide. In this way, manufacturing tolerances in the manufacture of the illumination device can be compensated for through calibration.

According to a refinement, it is provided that the illumination device is adapted to a user's brightness requirement by means of a brightness control, in particular a dimming, of individual light sources. The user may be an end user, for example. The brightness control can be adjusted according to a user input by the user. For this purpose, the user can be provided with an operating unit, for example a mobile device (e.g. a Smartphone) or a suitably designed control unit of the motor vehicle (MMI, man-machine interface).

According to a refinement, it is provided that aging effects of the pixels of the screen are countered by a pixel-by-pixel brightness calibration of the illumination device, in particular the screen. In other words, the aging effects can be compensated for, in particular pixel by pixel, by the brightness calibration. For this purpose, the targeted actuation can be adapted accordingly to the aging effects.

According to a refinement it is provided that for the targeted actuation, each of the pixels of the screen is assigned precisely one coordinate along the precisely one line. This coordinate assignment can optionally be performed as part of the aforementioned calibration of the illumination device. Said coordinate is, for example, a one-dimensional coordinate along the precisely one line. In this way, a coordinate transformation takes place from a two-dimensional image area of the screen to the one-dimensional coordinate along the precisely one line. This enables particularly advantageous control of the linear light.

The invention also includes refinements of the method according to the invention that have features as have already been described in the context of the refinements of the motor vehicle according to the invention or the illumination device according to the invention. For that reason, the corresponding refinements of the method according to the invention will not be described again here.

BRIEF DESCRIPTION OF THE FIGURES

Exemplary embodiments of the invention are described in the following. In the figures.

Figure 1:
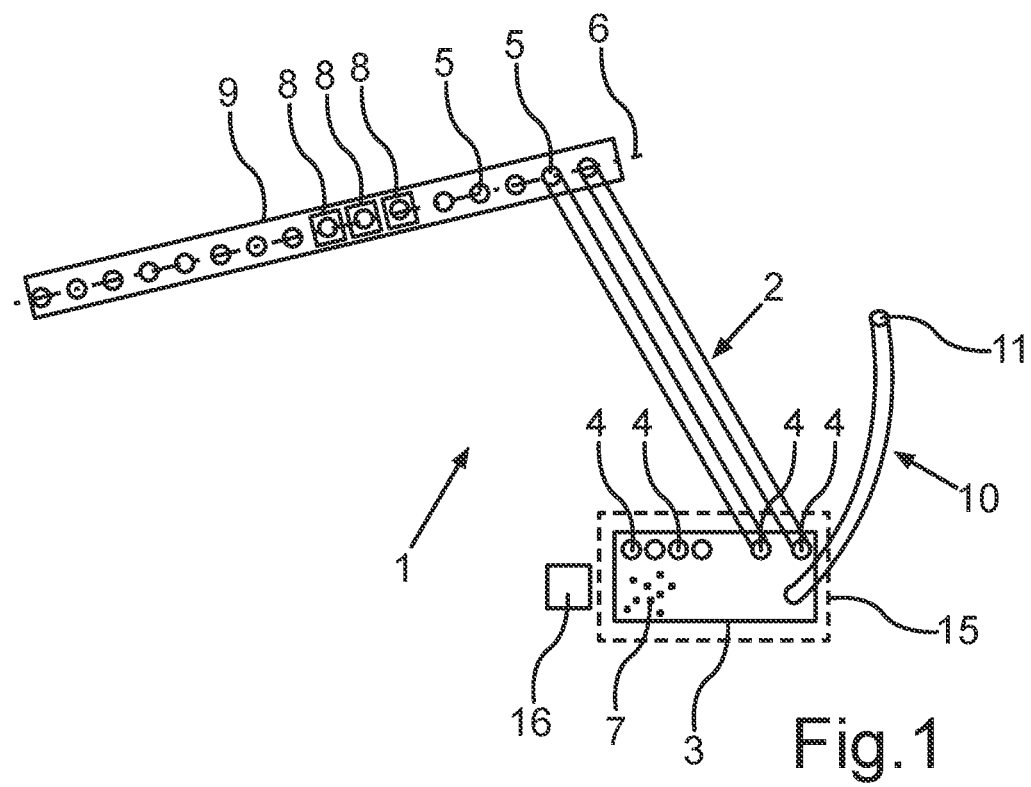
FIG. 1 is a schematic overview of an illumination device with optical waveguides.

The exemplary embodiments discussed in the following are preferred embodiments of the invention. In the exemplary embodiments, the described components of the embodiments each represent individual features of the invention to be considered independently of one another, which each also refine the invention independently of one another. The disclosure is therefore intended to include combinations of the features of the embodiments other than those shown. Furthermore, the described embodiments can also be supplemented by further features of the invention that have already been described.

DETAILED DESCRIPTION

In the figures, the same reference numerals designate elements that have the same function.

FIG. 1 is a highly schematic depiction of an illumination device 1. The illumination device 1 comprises a plurality of optical waveguides 2, a screen 3, and an emitting part 9. Each of the optical waveguides 2 has a first end face 4 at one end and a second end face 5 at its second end. The screen 3 has a plurality of pixels 7.

The optical waveguides 2 are arranged with their first end face 4 on the screen 3. This arrangement is provided such that the screen 3 or its pixels 7 couple light into the optical waveguides 2 via the respective first end faces 4 of the optical waveguides 2. In other words, when the illumination device 1 is in operation, light is coupled into the optical waveguides 2 by means of the screen 3 or by means of the pixels 7. Each of the pixels 7 can be understood as an independent light source.

The optical waveguides 2 are configured to transport light coupled into the respective first end face 4 to the respective second end face 5. The optical waveguides 2 are further configured to emit the light that is coupled in via the first end face 4 via the respective second end face 5. In other words, when the illumination device 1 is in operation, light is emitted by the optical waveguides 2 via their respective second end faces 5. The optical waveguides can be embodied as glass fibers or as optical fibers, for example. For example, the optical waveguides 2 may be made of quartz glass or plastic, in particular of polymers.

The second end faces 5 are arranged in an emitting part 9 along precisely one line 6. The precisely one line 6 can define a direction of extension of the emitting part 9. The emitting part 9 is designed to generate a linear light distribution, with the optical waveguides 2 being arranged with their respective second end faces 5 along the precisely one line 6. Each of the optical waveguides 2 is adjacent to no more than two other optical waveguides 2 in the region of the emitting part 9. The line 6 can be at least substantially straight. Alternatively, it is provided that the line 6 does not have a bend of more than 90°, a bend of more than 45°, or a bend of more than 20°. This results particularly advantageously in a linear light. In the region of their respective second end faces 5, the optical waveguides 2 are arranged in a plane that runs at least substantially parallel to a main emission direction of the illumination device 1. In the present FIG. 1, this plane is defined by the line 6 and by the main emission direction of the illumination device 1. In particular, said plane is arranged at right angles to the second end faces 5 of the optical waveguides 2.

The illumination device 1 may have one diffuser plate 8 or multiple diffuser plates 8 in the region of the second end faces 5. The diffuser plates 8 or the diffuser plate 8 are arranged, in particular, directly on the respective second end faces 5. The diffuser plates 8 or the diffuser plate 8 can generally be arranged on the emitting part 9 in such a way that light emitted through the optical waveguides 2 is diffused by the diffuser plate 8 or the diffuser plates 8. As a result, the light emitted by the illumination device 1 becomes diffused. In particular, the visibility of the individual optical waveguides 2 from the outside is reduced. The light output by the illumination device 1 thus appears more homogeneous. In the region of the first end face 4, in particular between the first end face 4 and the screen 3, respective coupling elements can be provided. In the interest of clarity, the coupling elements are not shown in the present FIG. 1. Such a coupling element is designed to transform an emission angle of the screen 3 to an angle of incidence of the optical waveguides 2. This ensures that a particularly large proportion of the light output emitted by the screen 3 can be coupled into the optical waveguides 2.

FIG. 1 additionally shows another optical waveguide 10 with another second end face 11. The additional optical waveguide 10 can be provided for lighting purposes independently of the linear light distribution of the emitting part 9. In the present illumination device, however, it is provided that at least half of the optical waveguides 2, 10 of the illumination device 1 are guided to the emitting part 9. In other words, at least half of the optical waveguides 2 of the illumination device 1 contribute to the display of the linear light along the line 6. In other embodiments it can be provided that a higher proportion of optical waveguides 2, for example at least 70%, at least 80% or at least 90%, contribute to the display of the linear light. Accordingly, it can be provided that the screen 3 is designed to couple at least 50%, 70%, 80%, or 90% of its pixels 7 into optical waveguides 2, which contribute to the display of the linear light along the line 6.

For the targeted influencing of the linear light distribution along the precisely one line 6, pixels 7 of the screen 3 must be assigned to a respective one of the optical waveguides 2. Each of the pixels 7 is assigned to precisely one optical waveguide 2 into which it can couple light. This can be accomplished, for example, by means of a fixing element 15. The fixing element 15 brings each of the optical waveguides 2 into a predetermined position relative to the pixels 7 of the screen 3. Accordingly, each of the pixels 7 couples light into a previously determined one of the optical waveguides 2. The fixing element 15 can be configured, for example, as a ferrule which combines the plurality of optical waveguides 2 to form a bundle.

Alternatively or additionally, the assignment can take place as part of a calibration. Such a calibration is carried out in particular a single time during manufacturing of the illumination device 1. As part of the calibration, it can be determined which of the pixels 7 couples light into a respective one of the optical waveguides 2 during operation of the illumination device 1 and said pixel is assigned to the respective optical waveguide 2. In particular, each of the pixels 7 is assigned to no more than one of the optical waveguides 2. In this process it can be provided that one of the pixels 7 is assigned to one of the optical waveguides 2 only if it can couple light precisely into one of the optical waveguides 2. As part of the calibration, the pixels 7 can each be actuated briefly one after the other to emit light. During the respective light emission, it can be checked to determine which of the optical waveguides 2 is illuminated. The respective pixel 7 can then be assigned to that optical waveguide 2. This assignment can be stored in a control unit 16 of the illumination device 1, for example. This procedure is also valid if, due to an increased resolution of the screen 3, a plurality of pixels lie under each optical waveguide 2.

The control unit 16 can be designed to actuate the screen 3 or the pixels 7. The linear light distribution along the precisely one line 6 can be influenced by the targeted actuation of the screen 3 or the pixels 7. In particular, the pixels 7 are assigned a respective one-dimensional coordinate along the precisely one line 6. The pixels 7 can have a respective two-dimensional coordinate with respect to the screen 3. Depending on this two-dimensional coordinate, the pixels 7 can be assigned a respective one-dimensional coordinate along the line 6. Thus a coordinate transformation takes place. The one-dimensional coordinate along the line 6, which is assigned to an pixel 7, is provided in particular by the location along the line 6 of the respective optical waveguide 2 into which the respective pixel 7 can couple light.

Figure 2:
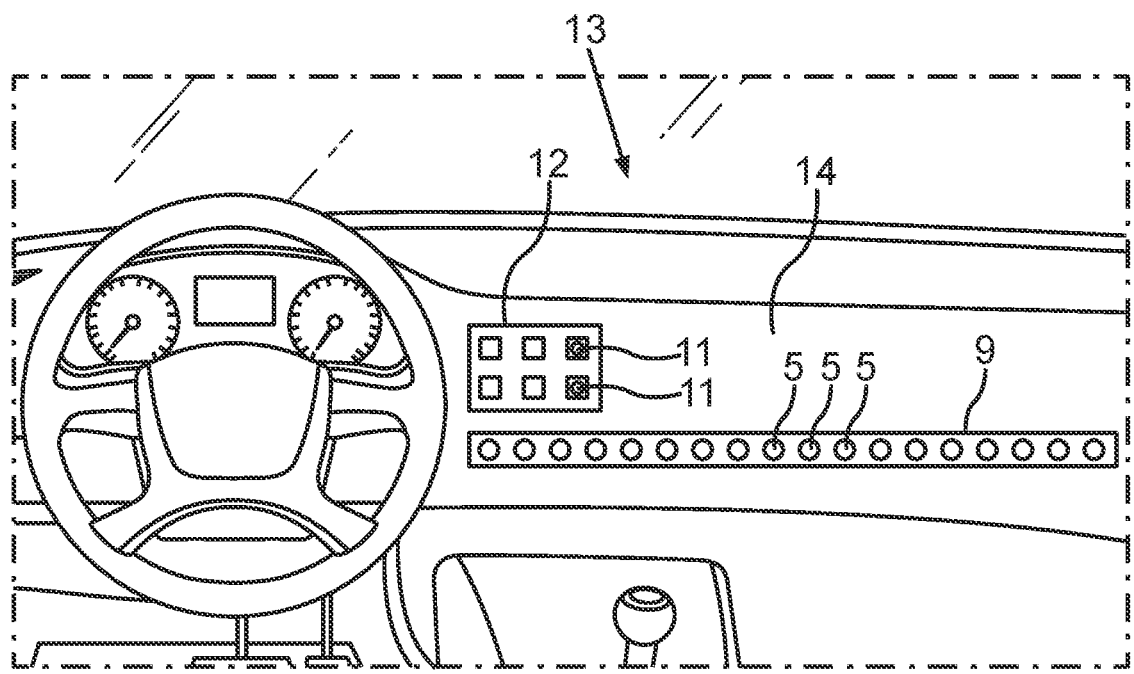
FIG. 2 schematically depicts a vehicle with such an illumination device.

Finally, FIG. 2 shows the interior 13 of a motor vehicle, in which the emitting part 9 is arranged on a vehicle component 14 of the motor vehicle. In the present case, the vehicle component 14 is configured as a dashboard. In the present case, a control panel 12 is also arranged on the vehicle component 14. In FIG. 2, additional optical waveguides 10 are used to illuminate the control panel 12. Accordingly, second end faces 11 of the additional optical waveguides 10 are arranged on the control panel 12. The illumination of the control panel 12 can be independent of the linear light distribution. Additional optical waveguides 10 can also be used to illuminate additional vehicle components other than the vehicle component 14. As described above, however, it must be ensured that at least half the optical waveguides 2 are used to display the linear light along the line 6.

Overall, the exemplary embodiment demonstrates how an improved display of linear light can be generated in a motor vehicle.

The invention claimed is:

1. An illumination device for a motor vehicle for displaying a linear light, comprising:
    a plurality of optical waveguides,
    an illuminating element having a plurality of light sources for coupling light into a respective first end face of the plurality of optical waveguides, and
    an emitting part for generating a linear light distribution, the optical waveguides being arranged with a respective second end face, which is different from the first end face, through the emitting part relative to one another along precisely one line, wherein the illuminating element is embodied as a screen, the plurality of light sources being provided by pixels of the screen, and
    wherein the illumination device is configured to influence the linear light distribution along the precisely one line by the targeted actuation of various pixels of the screen and each of the pixels of the screen is assigned at least one coordinate along the precisely one line.

2. The illumination device according to claim 1, wherein a coupling element for transforming an emission angle of the screen to an angle of incidence of the optical waveguides is arranged between the plurality of optical waveguides and the screen.

3. The illumination device according to claim 2, wherein the optical waveguides are arranged in the region of their respective second end faces in a plane that runs at least substantially parallel to a main emission direction of the illumination device.

4. The illumination device according to claim 2, wherein a fixing element of the illumination device is configured to optically couple the respective first end faces of each of the plurality of optical waveguides exclusively to only one or to multiple predetermined pixels of the screen.

5. The illumination device according to claim 2, wherein at least one diffuser plate is configured to diffuse light emitted through the optical waveguides.

6. The illumination device according to claim 1, wherein the optical waveguides are arranged in the region of their respective second end faces in a plane that runs at least substantially parallel to a main emission direction of the illumination device.

7. The illumination device according to claim 6, wherein a fixing element of the illumination device is configured to optically couple the respective first end faces of each of the plurality of optical waveguides exclusively to only one or to multiple predetermined pixels of the screen.

8. The illumination device according to claim 6, wherein at least one diffuser plate is configured to diffuse light emitted through the optical waveguides.

9. The illumination device according to claim 1, wherein a fixing element of the illumination device is configured to optically couple the respective first end faces of each of the plurality of optical waveguides exclusively to only one or to multiple predetermined pixels of the screen.

10. The illumination device according to claim 9, wherein at least one diffuser plate is configured to diffuse light emitted through the optical waveguides.

11. The illumination device according to claim 1, wherein at least one diffuser plate is configured to diffuse light emitted through the optical waveguides.

12. The illumination device according to claim 11, wherein the precisely one line by which the linear light distribution is defined does not have a bend of more than 45°.

13. A motor vehicle having an illumination device according to claim 1, wherein the emitting part is arranged on a vehicle component, in particular a door or a dashboard, of the motor vehicle.

14. A method for operating an illumination device in a motor vehicle, comprising the following steps:
    coupling of light into a plurality of optical waveguides via a respective first end face of the optical waveguides,
    coupling of the light out of the optical waveguides via a respective second end face of the optical waveguides, which is different from the first end face, and emission of a single common linear light distribution through the second end faces of the optical waveguides, arranged along precisely one line, wherein the light is coupled in by means of a screen, and the linear light distribution along the precisely one line is influenced by the targeted actuation of pixels of the screen, wherein for the targeted actuation, each of the pixels of the screen is assigned precisely one coordinate along the precisely one line.

15. The method according to claim 14, wherein for calibrating the illumination device, it is determined which of the pixels of the screen couple light into a respective one of the optical waveguides and these pixels are assigned to the respective optical waveguide, and this assignment is taken into account in the targeted actuation of the various pixels.

16. The method according to claim 15, wherein the illumination device is adapted to a user's brightness requirement by means of a brightness control, in particular dimming, of individual light sources.

17. The method according to claim 15, wherein aging effects of the pixels of the screen are countered by a pixel-by-pixel brightness calibration of the illumination device, in particular of the screen.

18. The method according to claim 14, wherein the illumination device is adapted to a user's brightness requirement by means of a brightness control, in particular dimming, of individual light sources.

19. The according to claim 14, wherein aging effects of the pixels of the screen are countered by a pixel-by-pixel brightness calibration of the illumination device, in particular of the screen.

\* \* \* \* \*